No. 813,359. PATENTED FEB. 20, 1906.
E. J. W. & F. I. DE FOREEST.
HOSE COUPLING.
APPLICATION FILED JUNE 27, 1905.
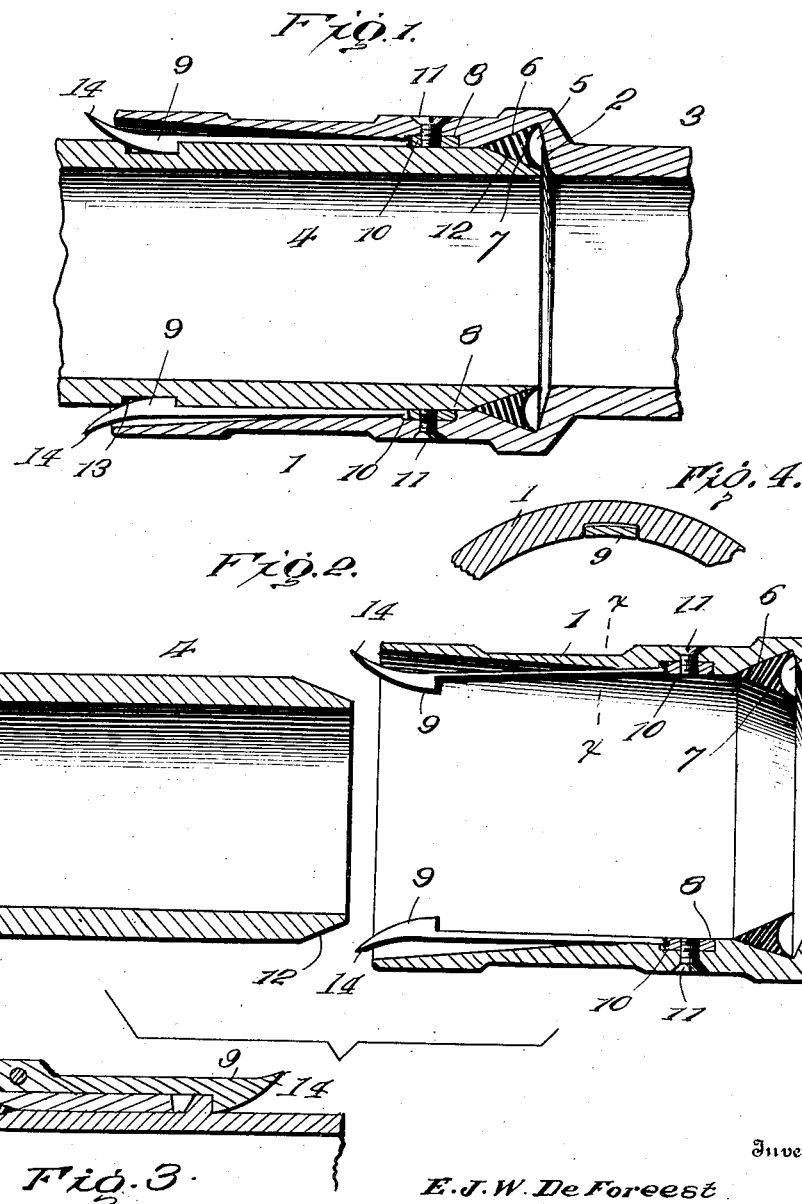

UNITED STATES PATENT OFFICE.

EARL J. W. DE FOREEST AND FRED I. DE FOREEST, OF BRADNER, OHIO.

HOSE-COUPLING.

No. 813,359.　　　　　　Specification of Letters Patent.　　　　　Patented Feb. 20, 1906.

Application filed June 27, 1905. Serial No. 267,250.

*To all whom it may concern:*

Be it known that we, EARL J. W. DE FOREEST and FRED I. DE FOREEST, citizens of the United States, residing at Bradner, in the county of Wood and State of Ohio, have invented certain new and useful Improvements in Hose-Couplings, of which the following is a specification.

This inventon relates to improvements in hose or pipe couplings of the detachable type, and has for its object to produce a device of this character which can be instantaneously connected or disconnected and which will form an exceedingly tight joint.

It consists, essentially, of an outer casing or shell detachably connected to an inner casing by means of spring-catches and of a peculiarly-shaped gasket, whereby an unusually water-tight joint is obtained.

A further object is to construct a hose-coupling which will be simple and durable in construction and which can be manufactured at a comparatively small cost.

For a full description of the invention and the merits thereof and also to acquire a knowledge of the details of construction of the means for effecting the result reference is to be had to the following description and accompanying drawings, in which—

Figure 1 is a longitudinal sectional view through the hose-coupling, showing the two members as locked together. Fig. 2 is a similar view showing the two members separated. Fig. 3 is a longitudinal sectional view showing the spring-catches as located entirely on the outside of the casing. Fig. 4 is a transverse sectional view on the line X X of Fig. 2 and shows the formation of the longitudinal grooves within which the spring-catches operate.

Corresponding and like parts are referred to in the following description and indicated in all the views of the drawings by the same reference characters.

The numeral 1 designates the outer casing, which is formed with an offset 2 and a neck 3, by means of which it is attached to one of the pieces of hose to be connected, and 4 is the inner shell or casing, which is attached to the other piece of hose and fits within the outer casing 1. The inner face of the outer casing is provided with two annular grooves, one of which, 5, is adjacent the offset portion 2 and is formed with an inclined face 6 and is adapted to receive the gasket 7, which is preferably made of rubber and which is approximately triangular in cross-section. Two faces of the gasket fit against the outer and inner casing 4, respectively, while the third face is concave, so that the pressure of the water will bear against the sides of the depression and tend to form a perfectly water-tight joint. The other annular groove 8 is spaced slightly from the groove 5. Spring-catches 9 are located in longitudinal grooves which extend from the end of the casing to the annular groove 8 and gradually increase in depth as they approach the end of the casing. The ends of the spring-catches 9 are provided with projections 10, which fit into the annular groove 8 and are held in position by means of screws 11. The inner ferrule 4 is provided with a beveled end 12, which fits against the gasket 7, and also with an annular groove 13, which is adapted to engage with the spring-catches 9 to hold the two members together. The ends of the spring-catches 9 extend slightly beyond the outer casing 1 and are curved outward at 14, so that the catches can easily be pulled out of engagement with the groove 13 in order to detach the two members.

From the foregoing description it will be readily understood that by the use of our device two pieces of hose or pipe can be instantly coupled together by simply thrusting the inner casing within the outer casing until the spring-catches 9 automatically engage with the groove 13 and that they can be as quickly detached by pushing the ends 14 of the spring-catches outwardly and pulling the two members apart.

Attention is called to the fact that we obtain an absolutely water-tight joint owing to the peculiar shape and position of the gasket 7.

It will be obvious that any number of spring-catches 9 may be employed without departing from the spirit of the invention and that they may be placed entirely on the outside of the casing, as shown in Fig. 3, if desired.

Having thus described the invention, what is claimed as new is—

1. In a hose-coupling, the combination of an outer ferrule or casing provided with a recess having an inclined face, an inner ferrule fitting within the outer ferrule and having an oppositely-inclined face, a gasket having an approximately triangular cross-section, two sides of which fit against the before-mentioned oppositely-inclined faces, while the third side is formed with a depression or groove so that the pressure of the water forces the sides of the groove tightly against the outer and inner ferrules respectively and forms an extremely tight joint, and means for holding the two ferrules together.

2. In a hose-coupling, the combination of an outer ferrule having an annular groove in its inner face and also a series of longitudinal grooves extending from the annular groove to the end of the ferrule, spring-catches fitting in the before-mentioned longitudinal grooves and provided at their inner ends with projections which are secured in the annular groove, and an inner ferrule fitting within the outer ferrule and having an annular groove which is engaged by the spring-catches to lock the outer and inner ferrules together.

3. In a hose-coupling, the combination of an outer ferrule having two annular grooves in its inner face and also a series of longitudinal grooves extending from the outer annular groove to the end of the ferrule, the inner annular groove having an inclined face, spring-catches fitting in the before-mentioned longitudinal grooves and having one end secured in the before-mentioned outer annular groove while the opposite end extends beyond the end of the ferrule to form a finger-piece, an inner ferrule fitting within the outer ferrule and having an inclined portion which comes opposite the inclined face of the inner annular groove and also having a recess which is engaged by the spring-catches to lock the outer and inner ferrules together, and a gasket having a wedge-shaped cross-section and fitting against the inclined face of the annular groove in the outer ferrule and the inclined portion of the inner ferrule.

4. In a hose-coupling, the combination of an outer ferrule having a series of longitudinal grooves in the inner face thereof, spring-catches operating in said longitudinal grooves, and an inner ferrule fitting within the outer ferrule and having a recess adapted to engage with the spring-catches to hold the two ferrules together.

In testimony whereof we affix our signatures in presence of two witnesses.

EARL J. W. DE FOREEST. [L. S.]
FRED I. DE FOREEST. [L. S.]

Witnesses:
FRANK W. PARMALEE,
JESSE A. LADD.